United States Patent
Xie et al.

(10) Patent No.: US 9,618,132 B2
(45) Date of Patent: Apr. 11, 2017

(54) TEMPERATURE DEPENDENT VARIABLE FLOW ORIFICE

(75) Inventors: Zhe Xie, Rochester, MI (US); Vijay A. Neelakantan, Rochester Hills, MI (US); Robert L. Moses, Ann Arbor, MI (US); John E. Marano, Milford, MI (US)

(73) Assignee: GM GLOBAL TECHNOLOGY OPERATIONS LLC, Detroit, MI (US)

(*) Notice: Subject to any disclaimer, the term of this patent is extended or adjusted under 35 U.S.C. 154(b) by 1331 days.

(21) Appl. No.: 13/527,922

(22) Filed: Jun. 20, 2012

(65) Prior Publication Data

US 2013/0015254 A1    Jan. 17, 2013

Related U.S. Application Data

(60) Provisional application No. 61/507,433, filed on Jul. 13, 2011.

(51) Int. Cl.
  *G05D 23/12* (2006.01)
  *G05D 23/02* (2006.01)
  *F16K 17/00* (2006.01)
  *F16K 31/00* (2006.01)
  *F16H 61/00* (2006.01)
  *F16H 61/02* (2006.01)

(52) U.S. Cl.
  CPC ....... *F16K 31/002* (2013.01); *F16H 61/0009* (2013.01); *F16H 2061/0279* (2013.01); *Y10T 137/7737* (2015.04)

(58) Field of Classification Search
  CPC ......... F16H 2061/0279; F16H 61/0009; F16K 31/002; Y10T 137/7737
  USPC ............................. 236/93 R, 101 R; 137/468
  See application file for complete search history.

(56) References Cited

U.S. PATENT DOCUMENTS

| | | | | |
|---|---|---|---|---|
| 4,429,552 A * | 2/1984 | Reedy | ..................... | F25B 41/06 137/468 |
| 4,464,080 A * | 8/1984 | Gorlov | ..................... | E02B 9/08 405/76 |
| 4,502,627 A * | 3/1985 | Ty | ........................... | F16H 59/72 236/101 E |
| 4,822,557 A * | 4/1989 | Suzuki | .................. | G21C 15/18 376/282 |
| 5,439,197 A * | 8/1995 | Itoi | ....................... | F16K 31/506 251/104 |
| 6,131,531 A * | 10/2000 | McCanna | ............... | B63B 22/18 114/331 |
| 6,485,255 B1 * | 11/2002 | Care | ....................... | F01D 5/187 415/12 |
| 6,525,343 B1 * | 2/2003 | Tanga | ................. | B01J 19/0046 257/252 |
| 6,557,827 B1 * | 5/2003 | Aoki | ........................ | F16K 7/18 251/313 |
| 2006/0142798 A1 * | 6/2006 | Holman | ........... | A61B 17/00234 606/215 |
| 2007/0163686 A1 * | 7/2007 | Zhang | ..................... | C22F 1/006 148/563 |

(Continued)

*Primary Examiner* — Henry Crenshaw

(57) ABSTRACT

A variable flow orifice for a hydraulic control system in a transmission includes a shape memory alloy that selectively increases and decreases the size of an orifice. The deformation of the shape memory alloy, and therefore the size of the orifice, is a function of the temperature of the transmission. During cold conditions the orifice size is increased and during normal operating conditions the size of the orifice is decreased.

10 Claims, 3 Drawing Sheets

(56) References Cited

U.S. PATENT DOCUMENTS

2010/0124687 A1* 5/2010 Brandon, II ...... H01M 8/04201
429/513

* cited by examiner

TEMPERATURE DEPENDENT VARIABLE FLOW ORIFICE

CROSS-REFERENCE

This application claims the benefit of U.S. Provisional Application No. 61/507,433, filed Jul. 13, 2011. The entire contents of the above application are incorporated herein by reference.

FIELD

The present disclosure relates to hydraulic control systems in transmissions for motor vehicles and more particularly to a hydraulic fluid orifice in the hydraulic control system having temperature dependent variable fluid flow.

BACKGROUND

The statements in this section merely provide background information related to the present disclosure and may or may not constitute prior art.

Current transmissions in motor vehicles are expected to have consistent, responsive shifting performance at all times and in all operating conditions. This means that a transmission must have sufficient clutch actuation response times even during cold start or cold operating conditions. In automatic transmissions, hydraulic fluid is used to actuate clutches in order to select or maintain gear ratios. However, in cold conditions where the transmission has not achieved nominal operating temperatures, the hydraulic fluid in the valve body has an increased viscosity. The increased viscosity of the hydraulic fluid can lead to additional hydraulic flow restrictions due to hydraulic circuit dimensions and fixed diameter orifices within the circuit. Restrictions can in turn lead to sluggish or non-responsive shift times and clutch actuation.

One solution is to increase the pressure of the hydraulic fluid at low temperatures to overcome orifice restrictions. However, increased pump size can be undesirable due to added cost, increased packaging size, and decreased fuel efficiency. Therefore, there is a need in the art to improve the performance of automatic transmissions in cold start conditions while minimizing costs and packaging requirements.

SUMMARY

A variable flow orifice for a hydraulic control system in a transmission is provided. The variable flow orifice includes a shape memory alloy that selectively increases and decreases the size of an orifice. The deformation of the shape memory alloy, and therefore the size of the orifice, is a function of the temperature of the transmission. During cold conditions the orifice size is increased and during normal operating conditions the size of the orifice is decreased.

In one aspect, the shape memory alloy is disposed in a recess of a transmission component.

In another aspect, the shape memory alloy is disposed between two gaskets.

Further aspects, advantages and areas of applicability will become apparent from the description provided herein. It should be understood that the description and specific examples are intended for purposes of illustration only and are not intended to limit the scope of the present disclosure.

DRAWINGS

The drawings described herein are for illustration purposes only and are not intended to limit the scope of the present disclosure in any way.

DETAILED DESCRIPTION

The following description is merely exemplary in nature and is not intended to limit the present disclosure, application, or uses.

Figure 1:
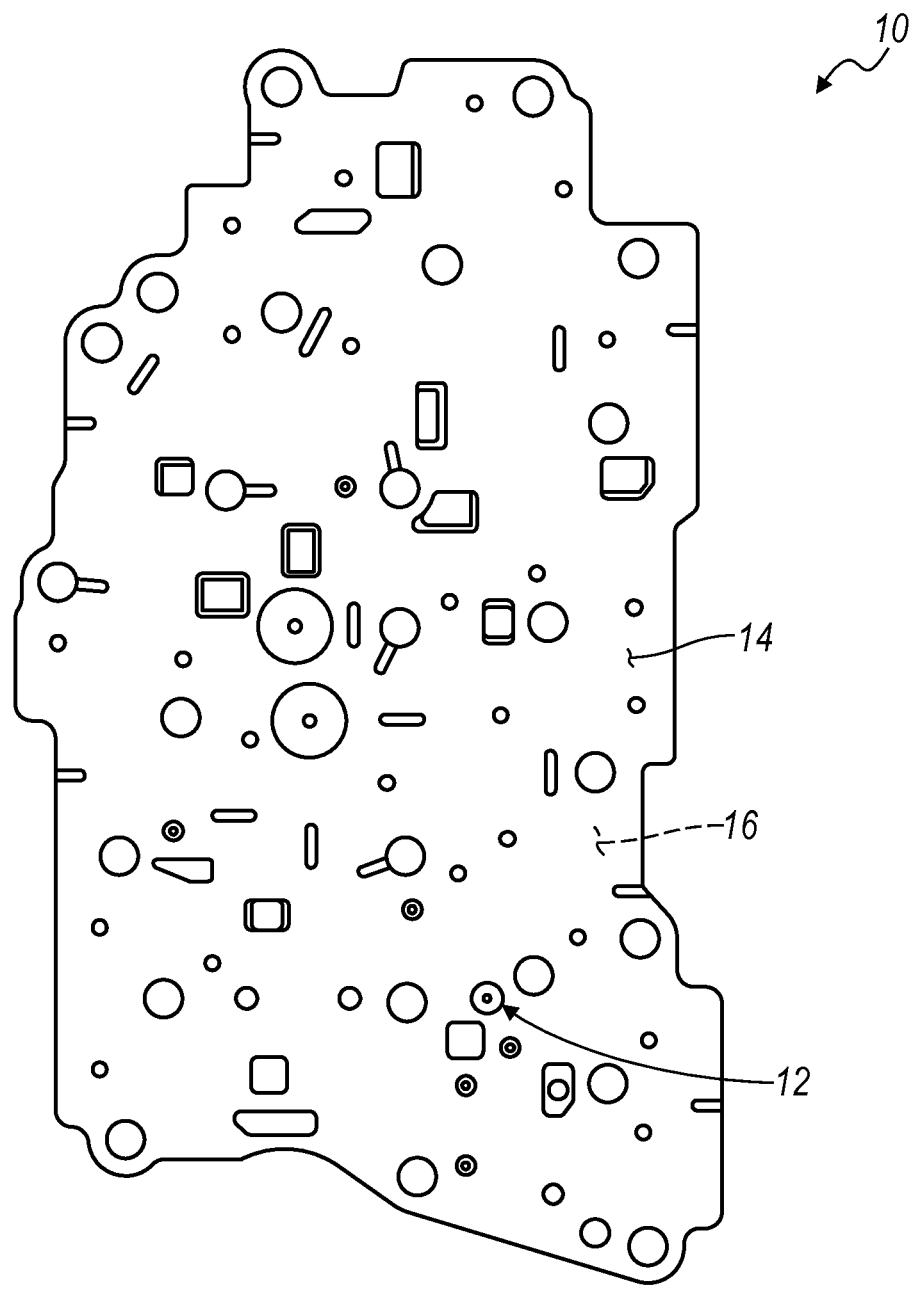
FIG. 1 is a top view of an exemplary valve body spacer plate having a variable flow orifice according to the principles of the present invention.

With reference to FIG. 1, a component of a hydraulic control system in a transmission is generally indicated by reference number 10. In the example provided, the component 10 is illustrated as an exemplary valve body spacer plate. The spacer plate 10 includes various bores, openings, flanges and features that receive, locate, support and protect the valve body halves, valves, and solenoids of the valve body. For example, the spacer plate 10 includes a variable flow orifice 12 that communicates hydraulic fluid from a first side 14 of the spacer plate 10 to a second side 16 of the spacer plate 10. The orifice 12 may hydraulically connect any number of components in the hydraulic control system together. For example, the orifice 12 may connect a pump outlet with a supply line in the valve body, or connect an accumulator with a pump or supply line, etc. However, it should be appreciated that the variable flow orifice may be located in various other transmission components, such as the valve body, without departing from the scope of the present invention.

Figure 2:
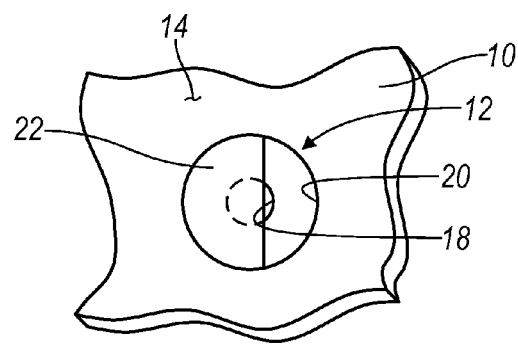
FIG. 2 is an enlarged, top view of a portion of the exemplary valve body spacer plate having a variable flow orifice.
Figure 3:
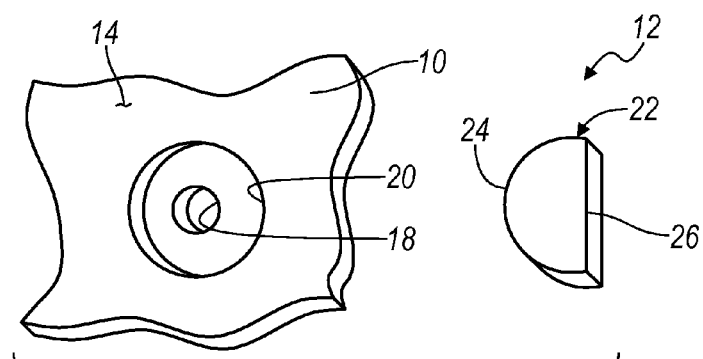
FIG. 3 is an exploded view of the exemplary valve body spacer plate and variable flow orifice shown in FIG. 2.

Turning to FIGS. 2 and 3, the variable flow orifice 12 is shown in detail. The variable flow orifice 12 includes a bore 18 that extends through the spacer plate 10. A recess 20 is formed around the bore 18 on the first surface 14. The recess 20 extends into the spacer plate 10 a predefined depth but does not extend through the spacer plate 10. A shape memory alloy (SMA) insert 22 is disposed within the recess 20. The SMA, also known as a smart metal, memory metal, memory alloy, muscle wire, and smart alloy, undergoes a transformation from one crystal phase to another over a particular temperature range. Above this range, the material exists as austenite. Austenite has a rigid crystal structure. The shape of a component while in the austenite phase is termed the memory shape. The low temperature phase, martensite, is soft and can be deformed about 6% from its original shape without causing any permanent deformation. Once deformed, martensitic material will remain in this deformed shape indefinitely. When heated later, the material transforms to the high temperature phase and returns to its memory shape. Exemplary SMA's include copper-zinc-aluminum-nickel, copper-aluminum-nickel, and nickel-titanium (NiTi) alloys. For example, the SMA insert 22 may be made from a NiTi alloy from Intrinsic Devices Incorporated, San Francisco, Calif., under the designation UNILOK.

Figure 4A:
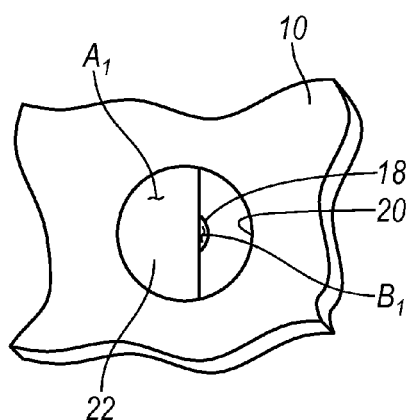
FIG. 4A is an enlarged, top view of a portion of the exemplary valve body spacer plate having a variable flow orifice in a first condition.
Figure 4B:
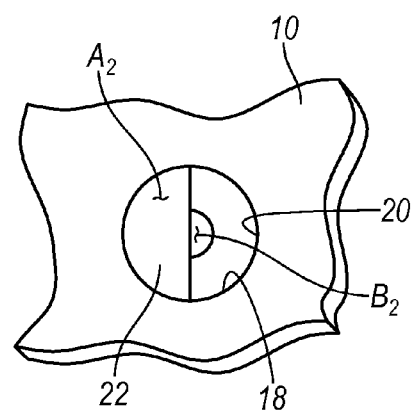
FIG. 4B is an enlarged, top view of a portion of the exemplary valve body spacer plate having a variable flow orifice in a second condition.

The SMA insert 22 is a semi-circular plate having a circular outer side 24 and a straight outer side 26. The circular outer side 24 has a radius that approximately matches a radius of the recess 20. The SMA insert 22 partially covers or obstructs the bore 18 in both the memory shape and the deformed shape, as seen in FIGS. 4A and 4B. For example, in FIG. 4A, the SMA insert 22 is in its shape memory state. In the shape memory state the SMA insert 22 has a surface area A1 which covers a portion of the bore 18 and leaves an area B1 of the bore 18 open to hydraulic fluid communication. In FIG. 4B, the SMA insert 22 is in its deformed state. In the deformed state the SMA insert 22 has a surface area A2 which covers a portion of the bore 18 and leaves an area B2 of the bore 18 open to hydraulic fluid communication. The surface area A1 of the SMA insert 22 in the shape memory state is less than the surface area A2 of the SMA insert 22 in the deformed shape. Therefore, the size of the opening B2 of the bore 18 when the SMA insert 22 is deformed is greater than the size of the opening B1 of the bore 18 when the SMA insert 22 is not deformed. Accordingly, the orifice 12 provides a variably sized opening via SMA insert 22 overtop the bore 18 that is controlled by the transition temperature of the SMA insert 22. Furthermore, since the opening of the bore 18 is controlled by the overlap between SMA insert 22 and bore 18, the percentage change of the opening area B1 to B2 is larger than the strain rate of the SMA insert 22 itself, which is critical in making the difference between area B1 and B2 larger than the typical 6% deformation of SMA material.

The transition temperature of the SMA insert 22 is tuned to the operating conditions of the transmission and includes adjustments for hysteresis. For example, during normal operating conditions, the temperature of the hydraulic fluid, and therefore the SMA insert 22, is at an elevated temperature. This temperature is greater than the transition temperature of the SMA insert 22. Therefore, during normal transmission operating conditions, the SMA insert 22 is in the memory shape. However, during cold start conditions when the hydraulic fluid is cool and therefore has a higher viscosity, the SMA insert 22 is at a temperature below the transition temperature and the SMA insert 22 is in the deformed shape. This allows the orifice 12 to have a greater flow rate therethrough during cold start conditions.

Figure 5:
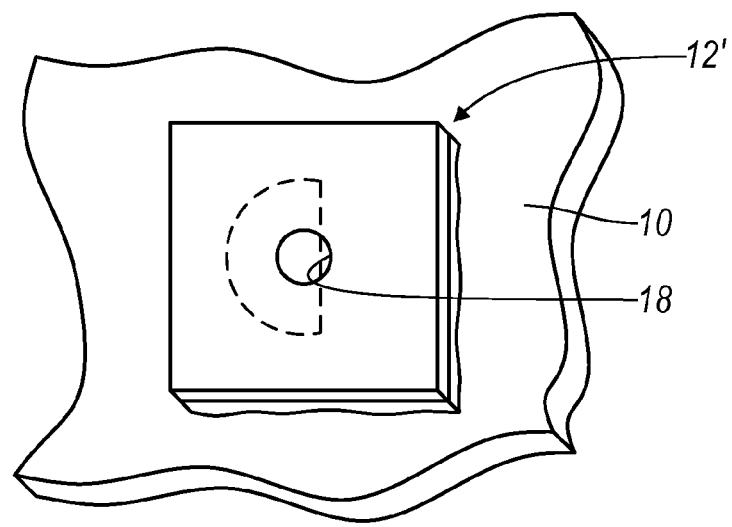
FIG. 5 is a top view of a gasket having a variable flow orifice according to the principles of the present invention.
Figure 6:
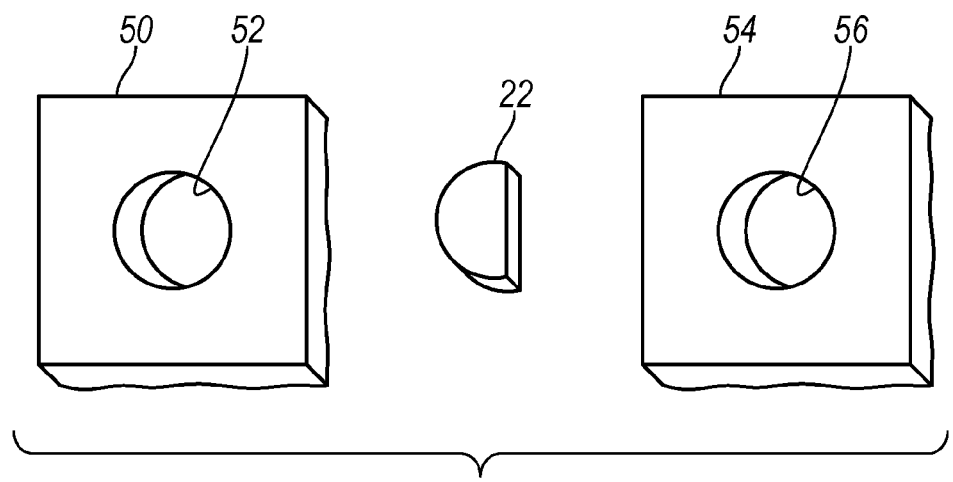
FIG. 6 is an exploded view of the gasket having a variable flow orifice shown in FIG. 5.

With reference to FIGS. 5 and 6, an alternate embodiment of the variable restriction orifice is indicated by reference number 12'. The orifice 12' is disposed over the bore 18 of the spacer plate 10. The orifice 12' includes a first gasket 50 having a hole 52 formed therethrough, the SMA insert 22 described above, and a second gasket 54 having a hole 56 formed therethrough. The SMA insert 22 is disposed between and sandwiched by the gaskets 50 and 52. The SMA insert 22 is aligned with the bore 18 as described above. In the variable flow orifice 12', the gaskets are held in place by compression between the spacer plate 10 and the valve body (not shown), and accordingly the recess 20 is not present. The variable flow orifice 12' operates in a manner similar to the variable flow orifice 12.

By using a variable flow orifice, the transmission response time during cold operating conditions is improved by increasing the flow rate of the relatively high viscous hydraulic fluid. In addition, the device is passive and does not require active control. Finally, the known transition temperature range of the SMA makes calibration of the variable flow orifice robust.

The description of the invention is merely exemplary in nature and variations that do not depart from the gist of the invention are intended to be within the scope of the invention. Such variations are not to be regarded as a departure from the spirit and scope of the invention.

The following is claimed:

1. A variable flow orifice for a transmission comprising:
   a spacer body that defines a bore and having an outer surface, wherein the spacer body includes a recess in the outer surface formed around the bore; and
   a single valve closing member consisting of a shape memory alloy (SMA) insert disposed within the recess and the bore, the SMA insert having a first shape and a second shape,
   wherein the bore has a first effective flow area when the SMA insert is in the first shape and a second effective flow area when the SMA insert is in the second shape, and wherein the first effective flow area is less than the second effective flow area, and wherein the SMA insert remains substantially co-planar with the outer surface when in both the first shape and the second shape,
   wherein the SMA insert is a semi-circular plate having a circular outer side and only a single straight outer side,
   wherein the recess and the bore are circular and wherein the circular outer side of the SMA insert has a radius that approximately equals a radius of the recess, and
   wherein the straight outer side of the SMA insert does not intersect a center radius of the circular outer side of the SMA insert when the SMA insert is in the first shape.

2. The variable flow orifice of claim 1 wherein the first shape of the SMA insert corresponds to a memory shape and the second shape of the SMA insert corresponds to a deformed shape.

3. The variable flow orifice of claim 1 wherein the SMA insert partially covers the bore when in both the first shape and the second shape.

4. The variable flow orifice of claim 1 wherein the SMA insert is comprised of copper-zinc-aluminum-nickel, copper-aluminum-nickel, or nickel-titanium alloys.

5. The variable flow orifice of claim 1 wherein the SMA insert changes from the first shape to the second shape when the temperature of the SMA insert falls below a transition temperature.

6. A variable flow orifice in a transmission comprising:
   a spacer body that defines a bore, wherein the spacer body includes a recess disposed concentric with the bore; and
   a single valve closing member consisting of a shape memory alloy (SMA) insert disposed within the recess and the bore, the SMA insert having a memory shape at a first temperature and a deformed shape at a second temperature,
   wherein the bore has a first effective flow area when the SMA insert is in the memory shape and a second effective flow area when the SMA insert is in the deformed shape, and wherein the first effective flow area is less than the second effective flow area,
   wherein the SMA insert is a semi-circular plate having a circular outer side and only a single straight outer side,
   wherein the recess and the bore are circular and wherein the circular outer side of the SMA insert has a radius that approximately equals a radius of the recess, and
   wherein the straight outer side of the SMA insert does not intersect a center radius of the circular outer side of the SMA insert when the SMA insert is in the first shape.

7. The variable flow orifice of claim 6 wherein the first temperature is greater than the second temperature.

8. The variable flow orifice of claim 7 wherein the first temperature corresponds to an operating temperature of the transmission and the second temperature corresponds to a cold start temperature of the transmission.

9. The variable flow orifice of claim 6 wherein the SMA insert partially covers the bore when in both the memory shape and the deformed shape.

10. The variable flow orifice of claim 6 wherein the SMA insert is comprised of copper-zinc-aluminum-nickel, copper-aluminum-nickel, or nickel-titanium alloys.

* * * * *